Figure 1:
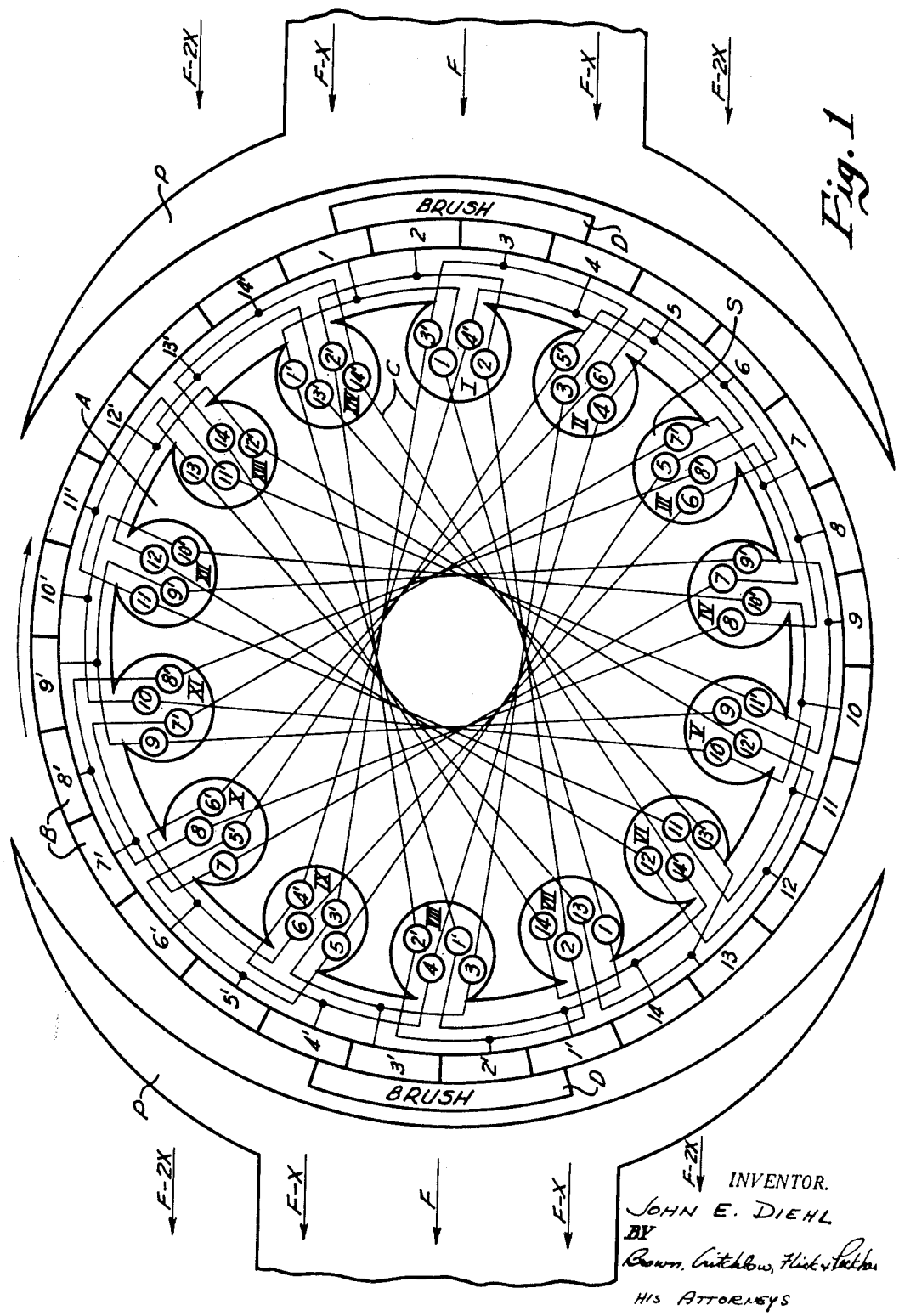

INVENTOR.
JOHN E. DIEHL

April 24, 1956    J. E. DIEHL    2,743,386
DIRECT CURRENT DYNAMOELECTRIC MACHINE
Filed July 6, 1955    2 Sheets-Sheet 2

INVENTOR.
JOHN E. DIEHL
BY
Brown, Critchlow, Flick & Peckham
HIS ATTORNEYS

United States Patent Office 2,743,386
Patented Apr. 24, 1956

2,743,386

DIRECT CURRENT DYNAMOELECTRIC MACHINE

John E. Diehl, St. Marys, Pa., assignor to Stackpole Carbon Company, St. Marys, Pa., a corporation of Pennsylvania Application July 6, 1955, Serial No. 520,268

4 Claims. (Cl. 310—202)

This invention relates to direct current dynamoelectric machines, and more particularly to the windings and brushes thereof.

In an attempt to overcome some of the objections to conventional direct current dynamoelectric machines, it has been proposed to provide the armature of such a machine with a plurality of independent coils, each having its ends individually connected to commutator bars lying substantially 180 electrical degrees apart. The brushes that engage the commutator are supposed to make simultaneous contact, at any given instant, with all of the bars that are connected to ends of coils which are near the maximum flux zone. To avoid sparking at the brushes, all of the bars in contact with a single brush should be connected to coils having exactly the same potential for a time somewhat greater than those bars engage the brush. In the machine just referred to, a maximum of only two adjacent bars can be at the same potential at any given moment, and, therefore, theoretically the thickness of the brush engaging them should not be greater than the width of one bar so that the brush will not engage more than two bars at a time. Practically, however, the results of some difference in potential can be tolerated and yet block current collection, or any controlled degree of sparking at the brushes, can be obtained if this potential difference is minimized by auxiliary or outside means, such as interpoles, compensating windings, high cross resistance or laminated step resistance type brushes, tapered pole pieces and/or other means already well-known in this art. Nevertheless, even under such circumstances, the number of coils that can be connected in parallel by the brushes is very limited. The reason that it is desirable to connect as many coils in parallel as possible is that it reduces the armature resistance and armature losses.

It is among the objects of this invention to provide a direct current dynamoelectric machine, in which the number of coils that can be used in parallel for any given machine with a predetermined permissible degree of brush sparking is greatly increased over any machines known heretofore, and in which the armature has a basically low resistance.

In accordance with this invention, the machine has a field member with poles providing a magnetic field, and a rotatable armature between the poles. The armature has a core provided with an even number of circumferentially spaced radial slots, and also a commutator provided with twice as many bars as there are slots. The bars are insulated from one another. There also are twice as many electric coils as slots. Each coil has coil sides located in a pair of the slots, with two coils in the same pair of slots. The slots of each pair are not 180 degrees apart. Instead, one slot of each pair is next to the slot diametrically opposite to the other slot of that pair, whereby there are several pairs of spaced parallel coils extending across the core with the two coils of each pair disposed on opposite sides of the axis of the armature so that the voltage in both of those coils is the same. Each of the pairs of spaced parallel coils is connected to two diametrically opposite commutator bars and is insulated from all other coils. A pair of diametrically opposite brushes engage those commutator bars connected to the coils that are near the maximum flux zone, and each brush is thick enough to engage at least two of the bars at all times, whereby at least four coils will always be in circuit.

The invention is illustrated in the accompanying drawings, in which

Figure 2:
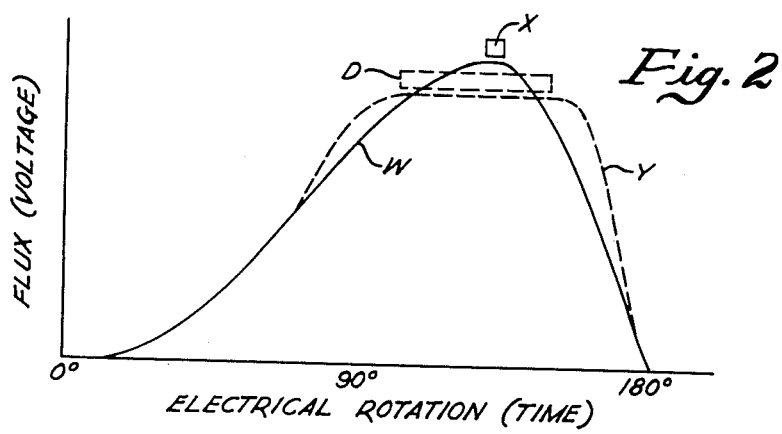
Figure 3:
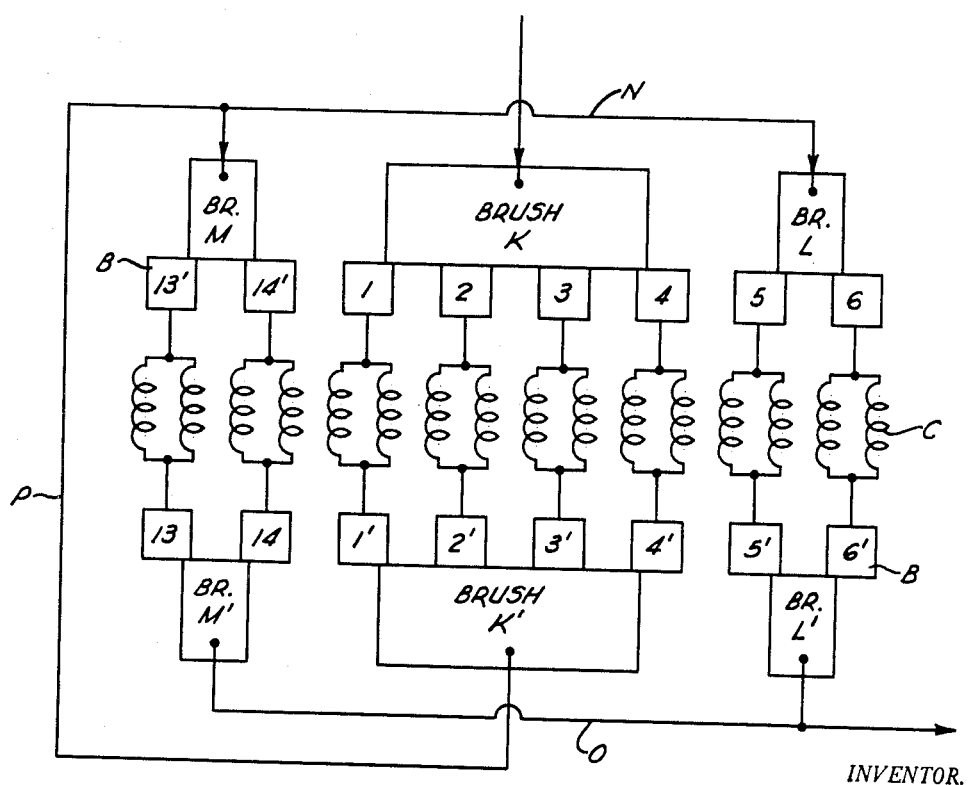

Fig. 1 is a schematic view of an electrical machine;
Fig. 2 is a graph; and
Fig. 3 is a diagrammatic view of a modification.

Referring to Fig. 1 of the drawings, which illustrates my invention schematically, a two pole, shunt wound, direct current generator is shown provided with a lap wound armature core A and non-concentric tapered tip field poles P. The armature has twice as many commutator bars as the core of the armature has coil slots; for example, twenty-eight bars B and fourteen slots S. There are the same number of coils as there are commutator bars; i. e. twenty-eight, each coil being represented by a straight line C extending between two of the armature slots. The standard type lap winding has been modified only to the extent of increasing the number of turns per coil, so as to obtain the same operating voltages as a conventional armature, and reconnecting one end of each coil lead in order to electrically connect pairs of coils to diametrically opposite bars. Although the commutator bars are shown around the coils, and the brushes D are shown between the field poles and the bars, they are shown in those positions only for ease of illustration. Actually, the commutator bars would be at one end of the armature, and the brushes would be moved about 90° around its axis. Whatever position the brushes occupy, the commutator bars they engage at any instant should be connected to those coils which are near the maximum flux zone as they are in the drawings. In the case of a generator, the maximum flux zone is the zone of maximum voltage generation. Instead of using a single brush at each side of the commutator, two or more parallel connected brushes could be used as is well known, so wherever a brush is referred to herein it will be understood to cover a multiple brush as well.

It is a feature of this invention that each coil has sides, represented by the small numbered circles at the opposite ends of each straight line, located in a pair of slots S (I and VII, for example) that are not diametrically opposite to each other. Instead, one slot (VII) of the pair is next to the slot (VIII) which is diametrically opposite to the other slot (I) of the same pair. This arrangement results in there being several pairs of spaced parallel coils extending across the armature, with the two coils (1—1 and 1'—1', for example) of each pair disposed on opposite sides of the axis of the armature. Each pair of these spaced parallel coils is connected to two diametrically opposite commutator bars and is insulated from all other coils and bars. It will be noted that although the voltages induced in the two halves (the portions in two slots) or any one working coil are different most of the time, the voltage induced in that coil is exactly the same as the voltage in its parallel mate. Consequently, no current is circulated within these permanently connected parallel coils. With twenty-eight coils, there are four coil sides in each slot. Also, there are two coils, insulated from each other, in the same pair of slots.

As an example of the way of analyzing the potential of the coils, the maximum flux is illustrated by the arrows F at the centers of the poles, and the amount of flux that is one and two slots away is represented by the arrows $F-X$ (F minus X) and $F-2X$. The coil 1—1 connected between commutator bars 1 and 1' lies in slots I and VII, while on the other side of the axis of the armature its parallel mate 1'—1', also connected to bars 1 and 1', lies in slots VIII and XIV. In the illustrated position of the armature, the maximum flux is cut by the coil sides in slots I and VIII, but something less than maximum flux $(F-X)$ is cut by the coil sides in slots VII and XIV. The flux cut by coil 1—1 therefore is $2F-X$, and the same thing is true of coil 1'—1', as well as of coils 2—2 and 2'—2' which likewise are in slots I–VII and VIII–XIV, respectively. These last two coils are connected to commutator bars 2 and 2'. By continuing this analysis it will be seen that the coils 3—3, 3'—3', 4—4 and 4'—4' connected to bars 3—3' and 4—4', also will have the same potential as coil 1—1, so four commutator bars at each side of the commutator will all be at the same potential for the armature position shown. This just doubles the number of bars at the same potential, compared under the same conditions with the best scheme that had been suggested heretofore. Also, it allows four bars to be engaged by each brush simultaneously, so that four pairs of coils will be put in operation at the same time. This is four times the number of coils that could be at the same potential before this invention. The brushes are shown not quite as wide as four bars, however, because if wider there would be times when they would be engaged by five bars. Even with four bars engaging a brush, the bar just beginning to engage the brush or just leaving it will have a different potential than the other three bars, but the difference in potential is negligible as compared with earlier machines and as a practical matter there will not be objectionable sparking. In fact, in some cases a brush can be allowed to engage more than four bars, and in any case my invention allows more bars to be contacted for a given permissible amount of sparking at the brushes than in any machines known heretofore. In such machines a practical limitation in the thickness of the brushes is reached much sooner than in my machine.

Practical non-compensated machines without interpoles, as well as all machines to a lesser extent, have considerable field distortion, depending on the speed and load. This condition is represented by the solid line wave form W in Fig. 2, where it will be seen from the short flat top of the wave that theoretically each brush X should span only one commutator bar. My invention, however, gives the result represented by the dotted line wave form Y, whereby a much thicker brush D can be used for any given limitation of sparking at the brushes. With thicker brushes, more coils are connected in parallel, with the advantage that a greater current output is produced than in conventional generators for the same voltage.

This invention applies equally well to electric motors, in which case the brushes D supply electric current to the commutator B instead of collecting current from it. A motor made in accordance with this invention is much more efficient than those known heretofore.

By proper adjustment of the brush positions and thicknesses a three circuit connection can be used, as indicated in Fig. 3. By reference back to Fig. 1, it will be seen that under simplified conditions the commutator bars 5, 6, 13' and 14', as well as bars 5', 6', 13 and 14, are at the same potential, even though their potential differs from that of the bars engaged by the thick brushes. Therefore, by adding secondary brushes L, L', M and M' as shown in Fig. 3, electrically connected in pairs by wires N and O, the bars engaged by them at any moment are all connected in parallel with one another to give a current capacity equal to that of the bars engaged by the primary brushes K and K'. This new parallel set of bars can be connected in series with bars 1, 2, 3, 4, 1', 2', 3' and 4' by conductor P for greater voltage output. This arrangement also makes it possible to obtain the increased voltage at a greatly increased current capacity compared with the best scheme known before this invention. The reason for this again goes back to the advantages gained by additional parallel coils in circuit.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A direct current dynamoelectric machine comprising a field member having poles providing a magnetic field, a rotatable armature between said poles, said armature having a core provided with an even number of circumferentially spaced radial slots and also having a commutator provided with twice as many bars as said slots, said bars being insulated from one another, twice as many electric coils as said slots, each coil having coil sides located in a pair of said slots with two coils in the same pair of slots, one slot of said pair being next to the slot diametrically opposite to the other slot of said pair, whereby there are several pairs of spaced parallel coils extending across the core with the two coils of each pair disposed on opposite sides of the axis of the armature so that the voltage in both of said two coils is the same, each of said pairs of spaced parallel coils being connected to two diametrically opposite commutator bars and insulated from all other coils, and a pair of diametrically opposite brushes engaging those commutator bars connected to the coils that are near the maximum flux zone, each brush being thick enough to engage at least two of said bars at all times.

2. A dynamoelectric machine according to claim 1, in which each brush is nearly as thick as the combined width of three commutator bars.

3. A direct current electric generator comprising a field member having poles providing a magnetic field, a rotatable armature between said poles, said armature having a core provided with an even number of circumferentially spaced radial slots and also having a commutator provided with twice as many bars as said slots, said bars being insulated from one another, twice as many electric coils as said slots, each coil having coil sides located in a pair of said slots with two coils in the same pair of slots, one slot of said pair being next to the slot diametrically opposite to the other slot of said pair, whereby there are several pairs of spaced parallel coils extending across the core with the two coils of each pair disposed on opposite sides of the axis of the armature so that the voltage in both of said two coils is the same, each of said pairs of spaced parallel coils being connected to two diametrically opposite commutator bars and insulated from all other coils, and a pair of diametrically opposite brushes making simultaneous contact at any instant with all of the commutator bars that are connected to coils in which the generated voltage is substantially equal.

4. A direct current dynamoelectric machine comprising a field member having poles providing a magnetic field, a rotatable armature between said poles, said armature having a core provided with an even number of circumferentially spaced radial slots and also having a commutator provided with twice as many bars as said slots, said bars being insulated from one another, twice as many electric coils as said slots, each coil having coil sides located in a pair of said slots with two coils in the same pair of slots, one slot of said pair being next to the slot diametrically opposite to the other slot of said pair, whereby there are several pairs of spaced parallel coils extending across the core with the two coils of each pair disposed on opposite sides of the axis of the armature so that the voltage in both of said two coils is the same, each of said pairs of spaced parallel coils being connected to two diametrically opposite commutator bars and insulated from all other coils, a pair of diametrically opposite primary brushes engaging those commutator bars connected to the coils that are near the maximum flux zone, each brush being thick enough to engage at least two of said bars at all times, a pair of electrically connected secondary brushes engaging commutator bars in the flux zone at opposite sides of each primary brush, and electrical conducting means connecting said secondary brushes in series with said primary brushes.

No references cited.